Fig 3

Patented Sept. 26, 1922.

1,430,485

UNITED STATES PATENT OFFICE.

WILLIAM F. ZIMMERMANN, OF NEWARK, NEW JERSEY, ASSIGNOR TO GOULD & EBERHARDT, OF NEWARK, NEW JERSEY, A CORPORATION OF NEW JERSEY.

HOB AND METHOD OF MAKING IT.

Application filed January 28, 1921. Serial No. 440,782.

*To all whom it may concern:*

Be it known that I, WILLIAM F. ZIMMERMANN, a citizen of the United States, and residing at Newark, in the county of Essex and State of New York, have invented a new and Improved Hob and Method of Making It, of which the following specification is a full disclosure.

This invention deals with the production of helical grooves by the progressive cutting action of a "hob" and it seeks to eliminate or render inconsequential certain inaccuracies created by reason of a heretofore unavoidable incompatibility between the actual contours and locations of the cutting edges of the hob and the sought-for contour of the helical groove.

It has been demonstrated that the ultimate efficiency, smoothness of action, and maintenance of a so-called "worm-drive" very materially depends upon the pressure-angles, contour and finish of the driving surface of the worm; this surface being represented by the face or faces, of the helical groove, or grooves, formed by the threads or teeth of the worm. Such a face, geometrically considered, is a warped surface produced by a generatrix revolving about and simultaneously translating in the direction of a directrix which may be regarded as the axis of the worm. In the case of a worm corresponding to a straight-sided rack, the generatrix is a straight line, but in other cases, it may be a line curved either in a plane or in a space of three dimensions. For instance, some designers have advocated a hyperbolic contour (in linear-section) on the supposition that it affords a maximum of rolling contact and a minimum of sliding contact with the mating tooth of the worm-wheel.

Such worms may be laboriously cut in a lathe by means of a lathe-tool having its cutting edge conforming to the contour of the linear-section, but the production of worms in that manner is too costly and irksome to satisfy commercial demands. Consequently, many attempts have been made to adapt the hobbing-process (long successfully used for making helical gears) for the generation of worms. Such efforts have heretofore produced only indifferent results for reasons either not clearly understood or because of errors non-rectifiable within the skill of the art.

An analytical investigation of this subject is an extremely operose matter owing to the abstruseness of the factors and relations involved. Attempts to ascertain the theoretical shapes and dispositions of the contours of the cutting-edges of the hob, by a mathematical analysis based on differential and integral calculus, have led only to lengthy differential equations incapable of solution save by unduly laborious successive approximations and the curves derived therefrom are incapable of being accurately reproduced by any practical method of making and grinding hobs. In fact, the purely theoretical discussions of this subject are still in controversy among the experts in this art.

I have, however, succeeded in discovering a practical method of so forming a hob as to enable it to be used as a means instrumental in successfully processing a worm truly conforming to any predetermined tooth-contour. This method is at once simple, essentially practicable, and capable of yielding a hob perfectly conforming to all requirements. This hob differs from any heretofore produced in that its cutting-edges are so contoured and so disposed as to be entirely compatible with the groove-contour selected for the worm to be manufactured.

If the periphery of a circular disk be given a contour accurately complementary to a circular groove, and if it be interfitted with said groove, the line of contact will wholly lie in an axial plane. But if the groove be helical, instead of circular, the contour of the circular disk will require modification and the line of contact will occupy a space of three dimensions; no two points on said line being in any given plane. This line of contact will represent the fundamental contour and locus of operation of the theoretically correct cutting-edge. All portions of such a cutting edge will cut simultaneously. If we are willing to have the successive cutting-portions come into action successively on the blank, they may in the aggregate form some other continuous (or dis-continuous) line; providing that all portions of such other line are circular projections of the fundamental contour. The actual cutting-edge may thus be made continuous. Likewise, the circular projections of the respective portions of the basic or fundamental cutting-edge, may be so distanced from the basic line that, in the aggregate, they form a discontinuous line or series of elemental cutting edges; since their circular projections will always reduce them to the basic-line. We are, therefore, at liberty to select the plane of our actual cutting-edge providing it is derived from the line of contact aforesaid; otherwise an interference will be encountered and the disk-cutter will fail to produce the contour aimed at in the blank. It is more convenient, as a matter of practical mechanics, to employ a continuous cutting-edge lying wholly in a given plane; as for example, one taken in linear section, or one taken at right angles to the thread. In the latter case, the undistorted shape of the contour will represent the normal section of the thread. It will, however, be seen from the foregoing that this plane does not represent the region of cutting-action of the successive portions of the cutting-edge, since such portions have their actual operative effects only when in coincidence with the aforesaid basic contour line which, as explained, occupies a space of three dimensions. It follows that, by making the normal section of each tooth of a disk-cutter conform to the circular projection of the basic contour, we can successfully cut a helical groove of any desired contour; providing it has no under-cut.

But a section thus derived and quite adequate for all the teeth of a disk-cutter would not answer for the successive teeth of a helical-cutter since the accumulative lateral displacement created by the drift of the helix should, to avoid interference, proceed from a fundamental contour of contact materially different from that characteristic of the relation between the same worm and a disk-cutter. Likewise, if we should attempt to make the normal section of the helix of the hob continuously complementary to the normal section of the helix of the worm, or similar to the section employed for the disk-cutter, we would encounter a pronounced interference due to the fact that the helical locus of such section does not coincide with the theoretically correct helical locus obtained by using the contour of contact as a generatrix, but is displaced in such a direction as will conflict with the wall that would be produced in the worm by the cutting action of a theoretically correct locus, assuming its surface to present an infinite number of teeth. If we should neglect all but a short length of the aforesaid cutting-helix, then would we avoid perceptible interference, but with the consequence that the few teeth representing the skeleton of that short length would have to do all the cutting, somewhat in analogy to the burden carried by the single tooth of a fly-cutter, and a hub so formed would be inadequate to meet the commercial requirements of worm-cutting. We require the action of many teeth, and consequently need to use a helix of at least one or more convolutions. And, accordingly, the teeth, or, more properly speaking, the cutting-edges (excepting those beyond the region of interference) must all fall within the helical space described by the so-called contour-of-contact as a generatrix.

I have, however, ascertained that the interference in such circumstances arises on one side only and, therefore, that the simplest way of producing a hob for a worm free of interference is to develop a double-sided helix adequate at its end to form the worm-contour and to deform one side or face of said helicoid sufficiently to avoid any untoward interference.

A primary purpose of this invention is, therefore, to develop an assymetrical helical locus for the successive cutting-edges of the hob which will enable it successfully and without any undercutting (due to interference) accurately to produce a true worm having any desired thread outline, either straight-sided or otherwise. Also to develop such a locus that, from a standpoint of practical mechanics, it can be reproduced by ordinary devices and methods of shop practice adequately understood by, and within the constructive capacity of, such mechanics as are available for manufacturing purposes. My method of making a hob of this descripton may, for purposes of analysis, be said to consist in several steps; first, cutting a helix thread having a cross-sectional contour suitable for the requirements of a fly-cutter; i. e., a cutter having but one tooth or cutting edge; second, ascertaining the dimensions and proportions of what may be termed the path or region of interference of this hob-thread when conceived to be in working relation with the true helix of the worm; third, then precisely determining the form and dimensions of a secondary locus of truly helical shape which, if substracted from the appropriate side of the primary helix, would eliminate the normal interference due to the latter; and fourth; in re-cutting the primary helix; using the pre-calculated lead and contour of the thus-derived secondary clearance.

This invention accordingly proposes an improved process of continuously producing a single or multiple thread worm, and it also proposes a method of making a hob capable of being used as a means instrumental in carrying out the worm-making process, and it also embraces, as a new article of manufacture, a novel hob.

Other objects and advantages will be in part indicated in the following description and in part rendered apparent therefrom in connection with the annexed drawings.

To enable others skilled in the art to so fully apprehend the underlying features hereof that they may embody the same in the various ways contemplated by this invention, drawings depicting a preferred typical construction have been annexed as a part of this disclosure, and in such drawings like characters of reference denote corresponding parts throughout all the views, of which :—

Figs. 4 to 12 inclusive are explanatory of the development of said hob.

The graphical step of deriving the interference constants can best be explained by way of a concrete example. Let it be desired to hob a worm having the following characteristics:

1.0234″ linear pitch
0.9075″ normal circular pitch
2.5000″ pitch diameter
3.0720″ outside diameter
4.0936″ lead
0.6241″ depth of tooth
0.4535″ thickness along normal chord
0.2901″ addendum.
Angle of thread with axis=62° 28′ 15″
Pressure angle in linear direction=30°
Number of threads=4 right-handed.

For determining the interference constants, I preferably resort to a graphical solution, such as that herein described:—arrived at through an application of the principles of descriptive geometry. This has the advantage of being not unduly difficult and of visualizing the interference on a magnified scale. The graphical analysis is superior to any physical or mathematical examination, although the latter may be resorted to for the purpose of arriving at the values from which the lead of the auxiliary helix may be computed. In laying out the successive drawings, when following the graphical method, it is recommended that a scale of say 10:1 be adopted so as to reduce to an inconsequential degree the proportionate effect of such minor inaccuracies as may be expected in the execution of well-made drawings.

Let it be required to cut the above defined worm by means of a single thread hob having a given outside diameter of say 4.500″. Its normal circular pitch must, of course, be identical with that of the worm. Let its depth of tooth be 0.668, its nor. chord. thickness be 0.4537, and its corr. add. be 0.334, and its lead be 0.9101, and the angle of its thread with the axis be 85° 4′ 36″.

An accurate enlarged projection of the helix of the worm will first be drawn. It will suffice to obtain the skeleton of the complete helix, i. e., three line helices representing respectively the root circle, the pitch circle, and the outermost circle of the thread.

Figures 4, 5, 6:
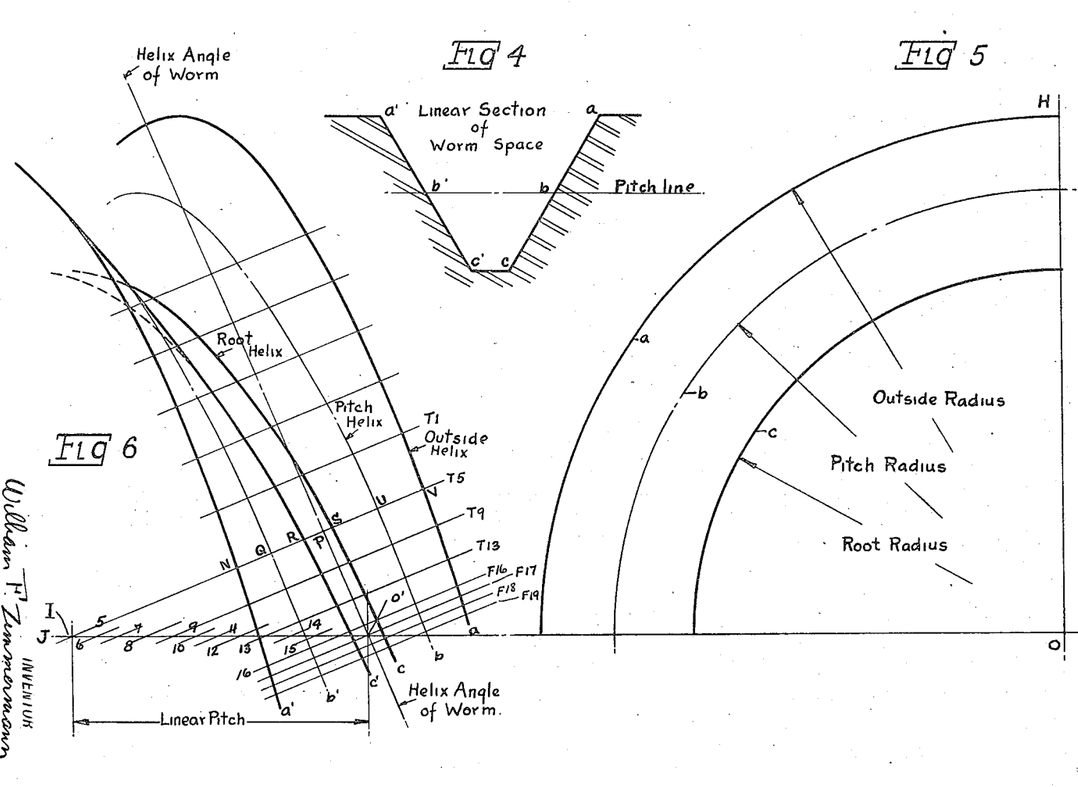
Fig. 4 showing the linear section of the predetermined groove.
Fig. 5 showing a transverse projection of the helical elements of said groove.
Fig. 6 showing a projection in an axial plane of the same together with the traces of certain auxiliary planes.

Referring now to Figs. 4 to 12, there will be seen a full disclosure of my derivation of the hob helicoid suitable for the given worm. The circular arcs $a$, $b$ and $c$, are accurately described by Fig. 5 to represent the outside, pitch and root circumferences. These three quadrants in practise will be drawn on the selected magnified scale. This view represents a projection on a plane transverse to the axis of the worm. From it is derived a projection on an axial-plane represented by the trace H—O by laying-off on the base line J—O a length I—O′ equal to ¼ of the lead. Now, by dividing the quadrants $a$, $b$ and $c$ and the ¼ lead into an equal number of parts, and by locating the intersections of the respective lines projected horizontally from the points on the quadrants and the corresponding points on the ¼ lead, the helices (in projection) of the pitch line $b$, the root $c$, and the outside circumference $a$, respectively, will be obtained. By shifting these helices to the right and left of the point O′ a distance equal to ½ of $a$—$a′$, $b$—$b′$, and $c$—$c′$ (Fig. 4) we will obtain the projection of the helicoid of the groove of the worm, as shown by Fig. 6.

Figures 7, 8, 9:
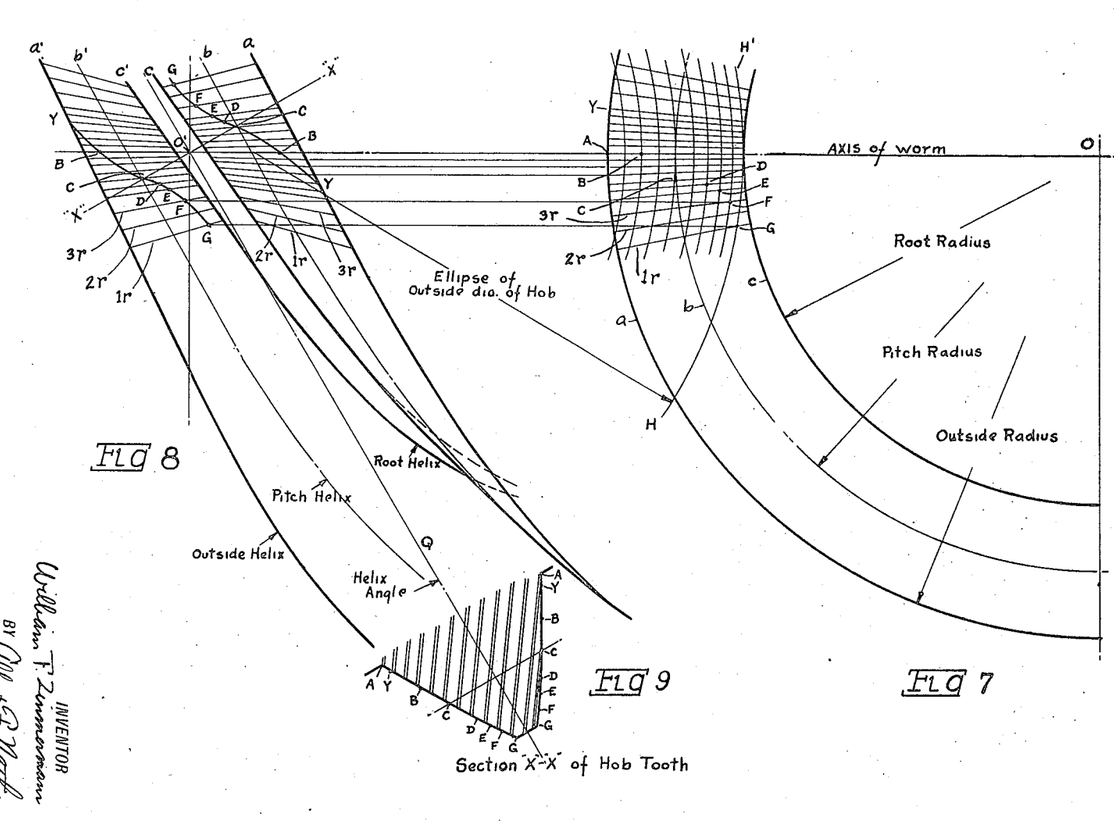
Fig. 7 showing a view similar to Fig. 5 with the addition of radial development planes and hob ellipsis.
Fig. 8 showing a development of the relation between the worm helix and the hob helix.
Fig. 9 showing the normal section of a hob tooth derived from Fig. 8.
Figure 10:
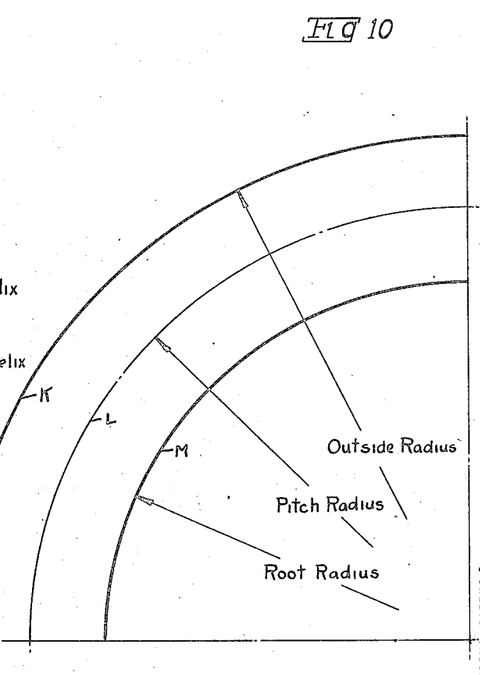
Figs. 10 and 11 showing development of the hob helicoid analogous to the development of Figs. 5 and 6.
Figure 11:
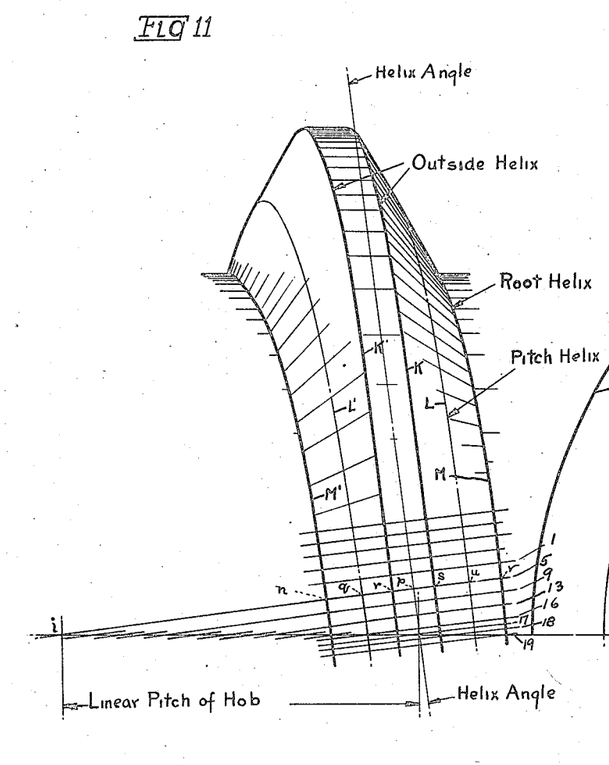

By a like procedure, is obtained the extension of this projection shown by Figs. 7 and 8 and, similarly the projection of the helicoid for the hob, shown by Figs. 10 and 11, is obtained.

The contour (Fig. 9) suitable for a disk-cutter is now derived. A series of radial-planes are drawn to cut the worm-blank; these planes being located by their traces $1^r$, $2^r$, $3^r$, etc. on Figs. 7 and 8. They are located on the walls of the helicoid of Fig. 8 by projecting over their intersections with the circles $a$ and $c$ of Fig. 7 and drawing straight lines between the corresponding intersections on the helices $a$, $a′$, $b$, $b′$, $c$, and $c′$; these lines being straight in all projections since the linear section of this worm is straight-sided. A disk-cutter may be regarded as composed of an infinite number of circles, or thin disks, of different diameters assembled on a common axis at various distances from a central point. This axis (above the plane of the paper) may be regarded as the line $x$—$x$ (Fig. 8) and the central point is denoted by O'. Now, let us imagine an infinitely thin disk (of the same diameter as the outside diameter that has been selected for the hob) to be located concentric with O' so as to coincide with the line O'—Q drawn at the helix angle. This disk can be shifted along its axis $x$—$x$ until it hits an adjacent wall of the helicoidal groove. If it be shifted further, it would cut into said wall and create an interference. Therefore, the width from the center-line of a non-interfering disk-cutter, measured at its outside diameter, will be equal to the aforesaid shift.

To determine this, the curve H—H' is drawn on Fig. 7 to represent the projection of the circumference of said imaginary disk. This curve will be an ellipse having for its major axis the actual diameter of the hob and for its minor axis this diameter times the sine of the helix angle of the worm. Having drawn this ellipse, as shown by Fig. 7, its intersections with the traces $1^r$, $2^r$, $3^r$, etc., are noted and these are projected over to the corresponding traces on Fig. 8 and, of the various new intersections thus located, the one nearest to the line O'—Q is noted; this being the point marked G. By likewise taking different diameters, drawing their ellipses on Fig. 7, noting the intersections, projecting them and taking the nearest point of each set, there is obtained a series of points A, Y, B, C, D, E, F, and G on Fig. 8. These points are then projected onto the various diameters; thereby deriving the base contour represented by Fig. 9 which shows the normal section of the hob-cutting-edge suitable for a finishing tooth.

As has been explained, this section is not appropriate for the entire length of the helix of the hob for the reason that it would, if continued, give rise to interferences with the walls of the worm. It, therefore, requires to be progressively modified and the method of determining the extent and nature of the modification, will now be explained.

Referring to Figs. 6 and 11, the helicoid is shown cut by a succession of spaced planes 1 to 19 inclusive. These planes represent the successive relations attained between the above-derived section and the helicoidal groove as the blank and hob are relatively rotated. As shown, the line I—O' has been divided into twelve equal parts to represent the number of teeth which it is deemed advisable to have in one complete convolution of the hob. In this example, the worm is to have four threads and the hob but one and therefore the length I—O' (which eqals ¼ lead of worm) will correspond to the region of action of one revolution of the hob. It is not necessary to lay out the relation of the tooth-section to the worm in each of the divisions and therefore it will suffice to take every fourth division and draw lines such as 5, 9, 13 and 16 perpendicular to the helix angle of the worm. It is advisable, however, to draw lines through the last three or four divisions, as indicated by 16, 17, 18 and 19 to ensure great accuracy for the last few cutting edges inasmuch as they may be used as finishing teeth, as will hereafter appear. The Letters $T^1$, $T^5$, $T^9$, $T^{13}$, $F^{16}$, $F^{17}$, $F^{18}$ and $F^{19}$ indicate the teeth (see Fig. 1 corresponding to the planes taken. On Fig. 11, a similar lay-out for the hob helix is made.

Figure 12:
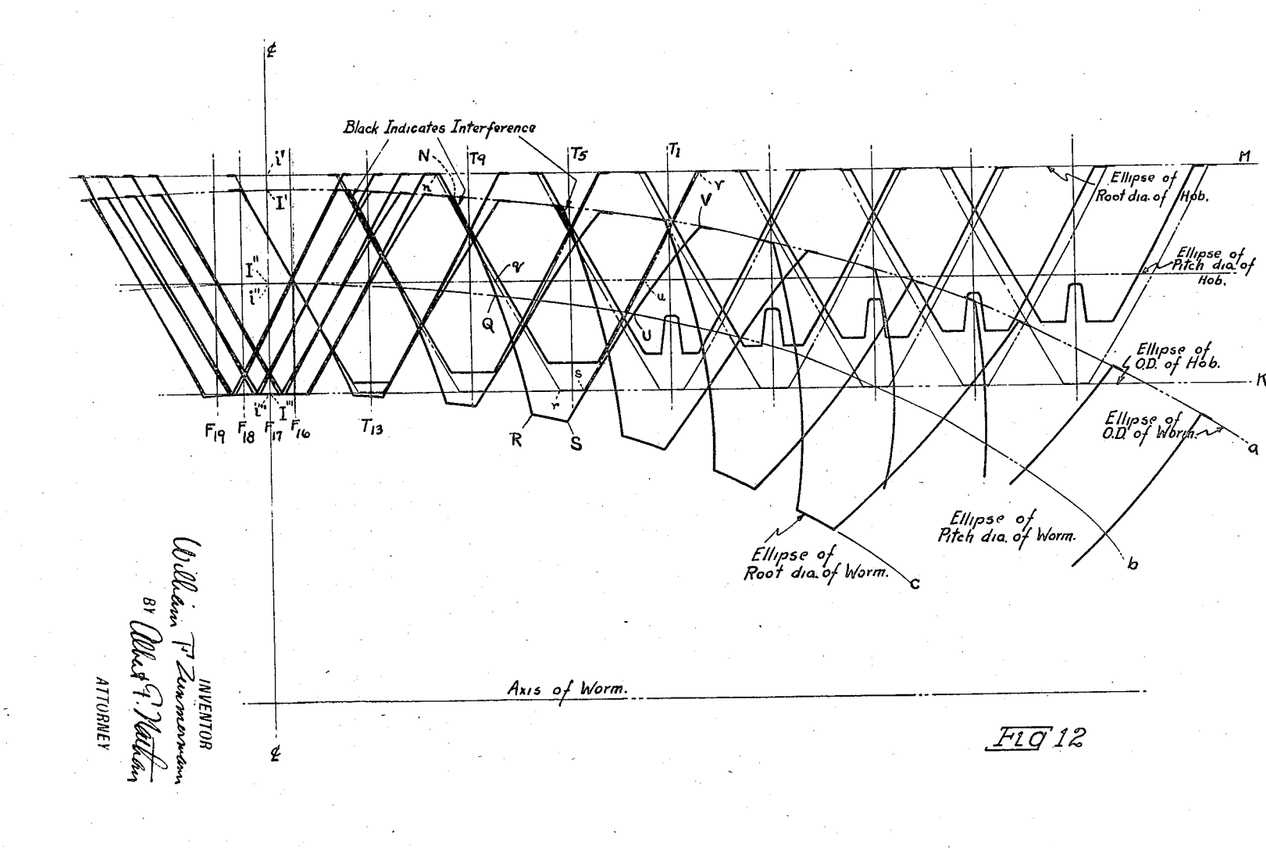
Fig. 12 showing an assembly whereby the interferences of the different positions progressively assumed by the normal section of Fig. 9 are accurately depicted.

Now, to ascertain the interferences between the section of Fig. 9 and the worm, in the various positions prescribed by said planes, the lay-out of Fig. 12 is made. There, all of the aforesaid planes are assembled in the plane of the paper. Lines $a$, $b$ and $c$ are the projections of the outside periphery, the pitch circle, and the root circle of the worm as cut by the plane O'—$F^{17}$ and, as this plane is at an angle with the axis of the worm, said lines $a$, $b$ and $c$ are elliptical curves.

Likewise, lines K, L and M represent the section of the hob cut by the same plane and, as this plane is likewise at an angle (here a very slight one) with the axis of the hob, these lines K, L and M are likewise elliptical; the minor axis of the ellipse being equal to the radius of the hob and its major axis being equal to said radius divided by the sine of the angle between said plane and the axis of the hob.

Having thus laid out these ellipses, the sections taken successively perpendicular to the line on Fig. 6, representing the helix angle, must be laid out and properly spaced on the ellipse of the worm shown by Fig. 12. These sections are those indicated by the trace-lines O'—$F^{17}$; 13—$T^{13}$; 5—$T^5$, etc., on Fig. 6. To lay out section $T^5$, for example, the distance from I to N is obtained by measurement from Fig. 6 and this length is laid off on the ellipse $a$ (Fig. 12), starting from the point I'. This locates the point N on the ellipse $a$. Likewise, the distance I—Q (from Fig. 6) is laid off on ellipse $b$ (Fig. 12), measuring from I'', and this gives the location of the point Q on the ellipse $b$. So, also, the distance I—R is ascertained from Fig. 6 and transferred to Fig. 12; it being laid off from the point I''', thereby locating R on ellipse $c$.

Through these points N, Q and R, a smooth curve is drawn and this gives us the true projection of one side of the tooth of the worm in question. The other side is determined by laying out the points S, U and V in like manner.

The contours of the projection of the corresponding tooth of the hob is now laid out on the ellipses M, L and K representing the hob in Fig. 12. The procedure is similar to that pursued with the worm. Thus, referring to Fig. 11, the distance from $i$ to $n$ is measured and is then transferred to Fig. 12 and is laid-off on the ellipse M from the point $i'$, and this gives the location of the point $n$. Similarly, the distance $i$—$q$ (Fig. 11) gives on Fig. 12 the point $q$. And the distance $i$—$r$ on Fig. 11 gives $r$ on Fig. 12. The remaining points $p$, $s$, $u$ and $v$ are likewise ascertained, and smooth curves, which are nearly straight, are drawn through these points.

The same procedure is followed until sufficient sections have been laid out; giving the entire series shown by Fig. 12.

This having been done, it will be seen that, at regions indicated by black in Fig. 12, there is an overlapping and that interferences exist at such places. It will be noted, however, that with respect to the last four teeth there is no appreciable interference, and also that in no case does any interference exist on both sides of the cutting-edge, but always on the same side. This is interpreted to mean that the last four teeth $F^{19}$, $F^{18}$, $F^{17}$, $F^{16}$, (the ones last acting to cut) need no deformation but may be preserved intact in the hob and used as finishing teeth. Also, Fig. 12, makes it clear that by merely recutting the helicoid of the hob on one side only, using a lead somewhat longer than the regular lead of the hob, all interfering portions will be eliminated; it being a simple matter to compute the auxiliary lead since, by measuring the black regions, the precise maximum amount to be removed for each tooth is readily ascertainable.

In this way, there is obtained a non-interfering helicoid; each side of which (by reason of being a uniform helix though of different lead from the other side) can be very easily and accurately cut by ordinary machine tools without involving the complications arising from any hob-design based on non-uniform or variable helices. By gashing and relieving this helicoid at appropriate points, there will be formed such cutting edges as may be desired, and the thus-formed hob, will accurately reproduce the predetermined worm.

It is to be noted that, in a hob thus formed, the labor of cutting will not be distributed to the best advantage among the various teeth, inasmuch as the successive cutting-edges would follow "Indian-file" in the path of the pioneer edge and the burden of the work of cutting the path would, to an excessive degree, fall upon the advance teeth; to the great disadvantage of the quality of the tooling operation and to the injury and rapid deterioration of the hob.

Now this invention also affords a remedy for the aforesaid obstacle to the processing of a worm by a hob in which all the teeth are substantially identical. Instead of presenting identical cutting-edges in succession to the helical path of the worm, my method proposes the use of teeth of different sizes so graduated that the labor will be distributed among the various teeth in proportion to the volume and quality of work which they are reasonably capable of withstanding; due regard being had for the ultimate aggregate achievement of the hob. That is to say, this invention contemplates, in its more intense aspect, not a hob merely capable of "roughing-out" operations, or one merely suitable for taking the light cuts essential to a purely "finishing" operations, but a dual-capacity hob combining in full measure both these qualities. In other words, each revolution of my hob not only cuts away a considerable amount of material (corresponding to a so-called "roughing operation") but also produces a substantially infinitesmal accurate facet not only accurately located in coincidence with the envelope of the predetermined worm-helix, but also presenting a surface well-finished according to the standards of a finishing cutter. These facets in the aggregate compose the smooth continuous surface of the ultimate helix of the worm and this surface is equal, if not superior, to that produced by a conventional disk-cutter; though at a far greater speed and consequently at a much lower cost.

Figure 1:
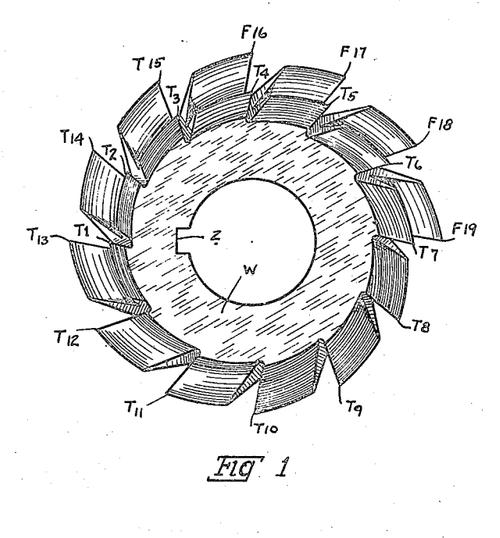
Fig. 1 is a side elevation of my improved hob.
Figure 2:
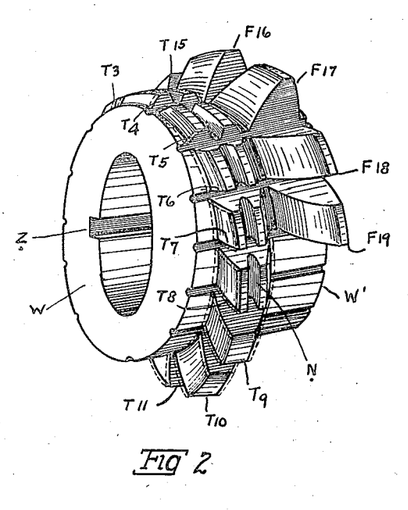
Fig. 2 is a perspective thereof.
Figure 3:
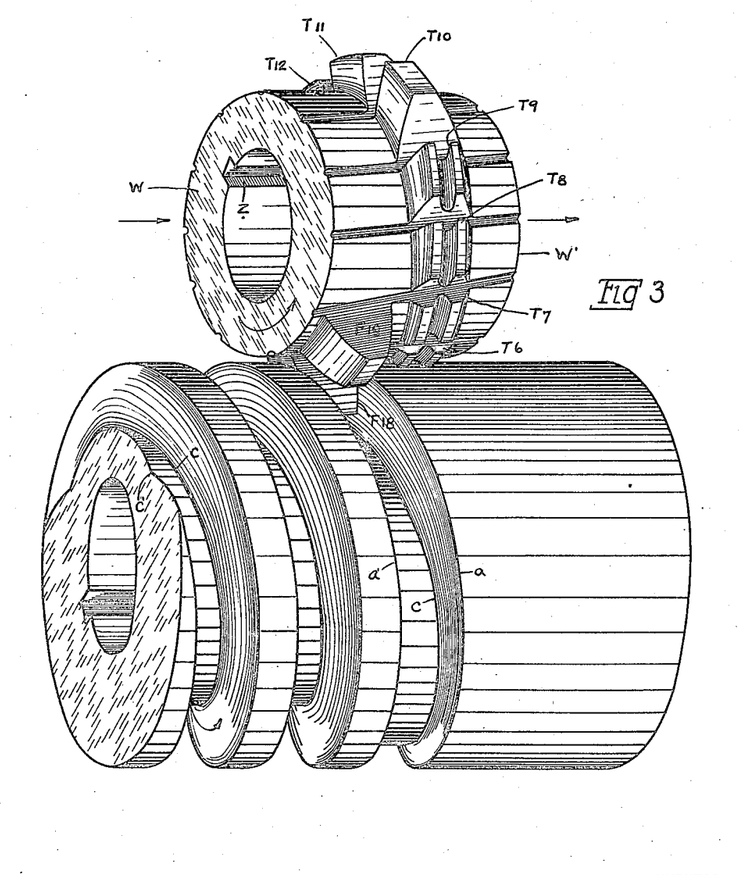
Fig. 3 is a perspective illustrating the hob in the act of cutting a helical groove in a blank.

The structural nature of this supplemental improvement over my previously disclosed primary invention, will be understood by referring to Figs. 1 to 3, inclusive.

It will be noticed that the first-acting cutting-edge $T^1$ has had a very considerable portion of its crown removed (without altering the sides of the helicoid) with the result that this tooth will make only a shallow cut into the blank. The next cutting tooth $T^2$ has somewhat less of its crown removed so that it will cut a little deeper into the blank and, since it follows directly in the path of tooth $T^1$, the amount of material removed by it will be approximately the same as that previously removed by the advanced tooth. This successive alteration is carried through the various teeth until somewhat over one convolution has been made; whereupon we come to tooth $F^{16}$, which has not been reduced, and which may, therefore, be regarded as a finishing tooth since its normal section responds to that shown by Fig. 9; likewise several subsequent teeth, such as $F^{17}$, $F^{18}$ and $F^{19}$, are also unaltered. It is to be noted that, beginning with tooth F¹⁶, the side wall of the helicoid has been reduced by employing the auxiliary lead, as previously described, so that no interferences will be produced by any of the advanced roughing teeth.

This rectification of the helix may of course, within the spirit of this invention, be developed on both sides of the tooth, as shown by dotted lines on Fig. 2, in which event, as a concomitant, the teeth will have a progressive cutting effect on both sides thereof. The removal of metal from both sides of the so-called roughing teeth is likewise clearly represented by Fig. 12; the heavier lines indicating the final contour to be given those teeth and the lighter lines on both sides of the ultimate contour, and spaced away therefrom, being the original contours. It will likewise be understood that it is not essential, in thus resorting to auxiliary leads, to remove only sufficient metal to avoid interferences, inasmuch as the removal of somewhat greater amounts of metal from the interfering side of the hob will merely have the effect of varying the distribution of the duty among the teeth; leaving the ultimate cuts to be made, as before, by the finally-acting undistorted tooth or teeth employed solely for finishing cuts as distinguished from roughing cuts. The crowns of the latter are preferably reduced uniformly beginning with tooth T²⁵ so that the peaks of their cutting edges may be said to lie in a spiral path. Certain of the advanced roughing teeth, as shown by Fig. 2, have their peripheries provided with notches, N, thus breaking up the chip and enabling the roughing tooth to act smoothly even though its periphery is relatively wide owing to the reduction aforesaid.

In order that this cutter may be properly and very accurately mounted in the hobbing machine, its side walls, W and W', are accurately located with relation to the helix and, likewise, its key-seat, Z, is preferably located in a definitely known relation to the finishing tooth F¹⁶, or to one of the other finishing teeth as F¹⁹, for assistance in mounting the hob in the hobbing machine preparatory to or during the cutting of the worm.

Without further analysis, the foregoing will so fully reveal the gist of this invention that others can, by applying current knowledge, readily adapt it for various utilizations without omitting certain features that, from the standpoint of the prior art, fairly constitute essential characteristics of the generic or specific aspects of this invention, and therefore such adaptations should be and are intended to be comprehended within the meaning and range of equivalency of the following claims.

The claims herein are directed to the tool and its method of manufacture while the claims to the method of developing a worm are included in a division application co-pending herewith.

Having thus revealed this invention, I claim as new and desire to secure by Letters Patent of the United States:—

1. The art of producing a hob adapted for cutting a helical groove consisting in first deriving the locus of the cutting-edges by using a generatrix complementary in shape to a helical projection of the predetermined contour of the groove, then determining the point of maximum interference between more than one convolution of said locus and continued convolutions of the groove, then ascertaining the helix that will pass through said point, and using said helix as a limiting value in cutting the helix of said hob.

2. A worm-cutting hob having a few normal finishing-teeth and a plurality of undersized roughing-teeth; said hob having a bore adapted to receive an arbor and said bore being provided with a key-seat located in definite angular relation with respect to the cutting-edge of a finishing-tooth near a roughing-tooth; whereby the operative position of said hob may be positively, accurately and invariably fixed with relation to the blank to be operated on.

3. A worm-cutting hob having a full-sized finishing-tooth and a plurality of under-sized roughing-teeth; said hob having an end-shoulder located a definite distance from the plane transverse to the axis of the hob and passing centrally through the peripheral portion of the cutting-edge of said finishing-tooth; whereby the operative position of said hob may be positively, accurately and invariably fixed with relation to the blank to be tooled.

4. The method of making a hob which consists in cutting a peripheral groove of uniform contour to form a non-tapering thread; then progressively removing a portion of a side face of said thread to give it a taper; then at intervals notching said tapered thread and removing portions of its periphery so as to form a series of cutting-edges, the peripheral portions of which lie at progressively different distances from the axis of the hob.

5. A method of manufacturing a hob capable of accurately cutting a worm which comprehends; the step of cutting in the periphery of a cylindrical blank a helical groove accurately counterparted to a projection of the contour of the predetermined groove of the worm; the step of determining on a greatly magnified scale by descriptive geometry the maximum extent to which a side-wall of said helical groove would, when in operative position, interfere with the adjacent side-wall desired for the groove of the worm; the step of computing therefrom the lead of an auxiliary helix that would start from a point of non-interference and continue to escape interference with the side wall of said worm; and the step of re-cutting the side-wall of said helical-groove, beginning with a point of non-interference and using the lead thus ascertained to produce a laterally tapered thread.

6. A method of making a hob by following the steps recited in claim 9 and also locating the successive peripheral cutting-edges of the hob at progressively decreased distances from the axis of the hob.

7. A method of making a hob as outlined by claim 9 and notching the thread thereby formed to produce one or more cutting edges exactly conforming to a projection of the original contour of said thread, and additionally notching said thread and reducing the edges to form a series of cutting-edges progressively distanced from the contour of the re-cut thread.

8. A hob having a number of under-sized roughing teeth provided with serrations, and also having a number of full-sized finishing teeth having continuous unbroken contours.

9. A milling-cutter having a series of cutting-edges coinciding with a spiral locus and provided with serrations; said series culminating in a few unbroken cutting-edges in coincidence with a helical locus constituting a portion of the maximum periphery of said cutter.

10. A hob for cutting worms having a disk-like shape and having a plurality of progressively wider and higher teeth arranged serially in from about one to not more than about two convolutions.

11. A disk-like worm-cutting hob having its cutting edges in a series convoluting through an angle of about 3 π, the peripheral portions of said cutting edges being successively a few hundredths of an inch more distant from the axis of the hob, and the last three teeth, or so, having their peripheral cutting-edges at substantially the same distance from said axis.

12. A disk-like worm-cutting hob having its cutting-edges arranged in a convolute series; the top and sides of the last few edges being precisely in coincidence with a helical locus; the outer sides of said remaining cutting-edges being in coincidence with a helical path having a lead slightly greater than the lead of the aforesaid locus; and the peripheral portions of said remaining cutting-edges being located at progressively increased distances from the peripheral portion of said locus.

13. A worm-cutting hob having a few normal finishing-teeth and a plurality of undersized roughing-teeth; said hob having an end-shoulder located a definite distance from the plane transverse to the axis of the hob and passing centrally through the peripheral portion of the cutting-edge of said finishing tooth; whereby the operative position of said hob may be positively, accurately and invariably fixed with relation to the blank to be tooled.

14. A disk-like worm-cutting hob having its cutting edges arranged in a helical series; the top and sides of the last few edges being precisely in coincidence with a helical locus; the outer sides of the remaining cutting edges being progressively spaced away from the aforesaid helical locus to form successively narrowed roughing teeth.

15. A disk-like hob having but few convolutions and providing several finishing cutting edges arranged in a truly helical path constituting the locus formed by a non-interfering section used as a generatrix; said hob also having a considerable number of said cutting edges lying within the aforesaid locus and progressively spaced therefrom on each side, to form roughing teeth so proportioned as to avoid all interference with the worm to be cut and each adapted to perform approximately the same work in removing metal.

16. A disk-like worm-cutting hob having a plurality of progressively higher teeth having their peripheral portions provided with serrations, said teeth being arranged serially in from about one to not more than about two convolutions, and also having a number of full-sized finishing-teeth having continuous unbroken contours.

In witness whereof, I hereunto subscribe my name, as attested by the two subscribing witnesses.

WILLIAM F. ZIMMERMANN.

Witnesses:
H. Ezra Eberhardt,
Charles L. Cameron.

Certificate of Correction.

It is hereby certified that in Letters Patent No. 1,430,485, granted September 26, 1922, upon the application of William F. Zimmermann, of Newark, New Jersey, for an improvement in "Hobs and Methods of Making Them," errors appear in the printed specification requiring correction as follows: Page 7, lines 9 and 14, claims 6 and 7, respectively, for the numeral "9" read 5; and that the said Letters Patent should be read with these corrections therein that the same may conform to the record of the case in the Patent Office.

Signed and sealed this 1st day of May, A. D., 1923.

[SEAL.]

KARL FENNING,
*Acting Commissioner of Patents.*